United States Patent [19]

Sato

[11] 4,406,520
[45] Sep. 27, 1983

[54] BEAM SPLITTER OPTICAL SYSTEM OF SIGNAL PICKUP DEVICE

[75] Inventor: Katsuharu Sato, Tokorozawa, Japan

[73] Assignee: Universal Pioneer Corporation, Tokyo, Japan

[21] Appl. No.: 292,714

[22] Filed: Aug. 13, 1981

[30] Foreign Application Priority Data

| Aug. 14, 1980 [JP] | Japan | 55-115605 |
| Oct. 30, 1980 [JP] | Japan | 55-156097 |
| Oct. 31, 1980 [JP] | Japan | 55-157157 |
| Oct. 31, 1980 [JP] | Japan | 55-157159 |

[51] Int. Cl.³ ............... G02B 27/10; G02B 3/06; G02B 5/30
[52] U.S. Cl. .................. 350/173; 350/394; 350/445
[58] Field of Search ............... 350/173, 171, 169, 174, 350/172, 170, 445, 420, 394, 395, 402, 403

[56] References Cited

U.S. PATENT DOCUMENTS

| 3,536,380 | 10/1970 | Ferguson | 350/445 |
| 4,178,074 | 12/1979 | Heller | 350/174 |

FOREIGN PATENT DOCUMENTS

| 362482 | 12/1913 | Fed. Rep. of Germany | 350/173 |
| 3023617 | 1/1981 | Fed. Rep. of Germany | 350/173 |
| 898664 | 7/1944 | France | 350/445 |
| 54-73065 | 6/1979 | Japan | 350/173 |
| 481461 | 3/1938 | United Kingdom . | |
| 1298086 | 11/1970 | United Kingdom | 350/445 |

OTHER PUBLICATIONS

"10¹⁰ bit auf einer Platte optisch gespeichert", Elektronik 1978, Heft 15, pp. 31–34.

Primary Examiner—Jon W. Henry
Attorney, Agent, or Firm—Fleit, Jacobson & Cohn

[57] ABSTRACT

An optical system for use in a signal pickup device of, for example, an optical video and/or audio disc player, comprising a beam splitter prism composed of two component segments forming therebetween a light polarization or semi-reflective mirror plane inclined at the angle of 45 degrees to a predetermined path of light through the prism, each of the component segments having an outwardly curved surface portion through which the path of light extends.

11 Claims, 19 Drawing Figures

Fig. 4
PRIOR ART
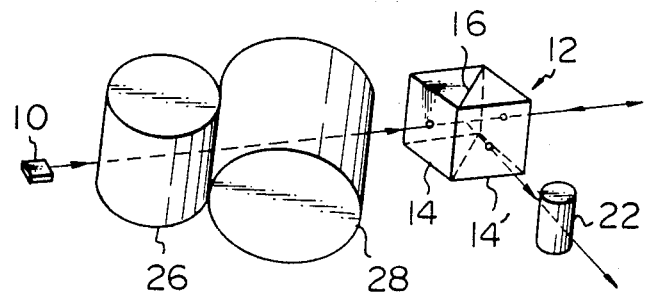
Fig. 5
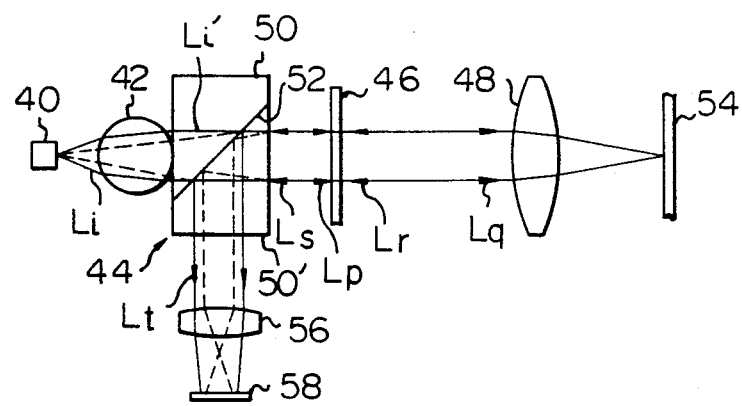
Fig. 6
Fig. 7
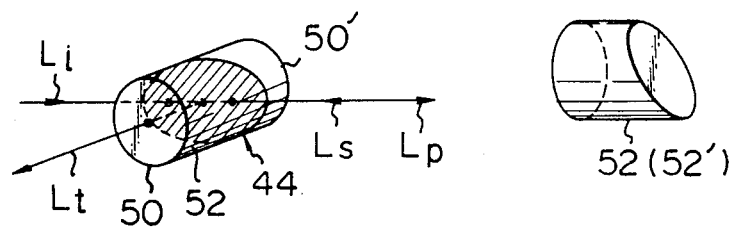

Fig. 8
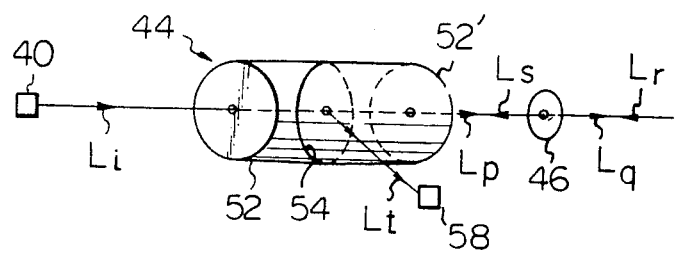
Fig. 9
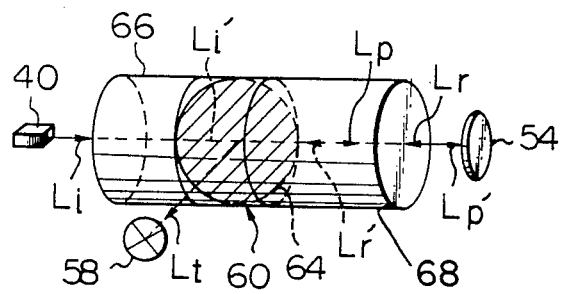
Fig. 10A   Fig. 10C
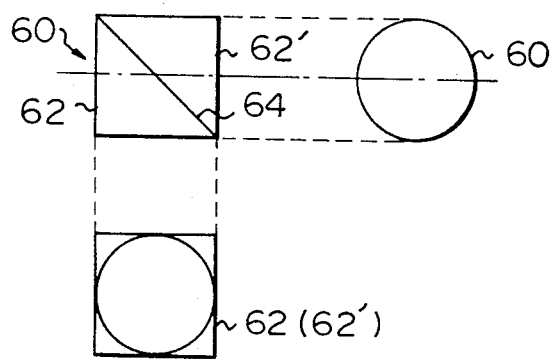
Fig. 10B

BEAM SPLITTER OPTICAL SYSTEM OF SIGNAL PICKUP DEVICE

FIELD OF THE INVENTION

The present invention relates to an optical system using a beam splitter prism. While such an optical system may find application in any signal pick up device, an optical system to which the present invention appertains is useful particularly when incorporated into a signal pickup device of a video and/or audio disc player.

BACKGROUND OF THE INVENTION

In a known optical system incorporated in a signal pickup device of an optical video and/or audio disc player, a beam of light emitted from a light source such as a semiconductor laser radiation element is directed to a beam splitter prism directly or through a lens system. The beam splitter prism has a parallelepiped construction and is composed of a pair of triangular or equilaterally pentahedral component segments having their respective base surfaces cemented together. The base surfaces of the component segments are inclined at the angles of 45 degrees to the side surfaces of the segments and constitute in combination a light polarization plane or a semi-reflective mirror plane by preference. The beam of light admitted into the beam splitter prism is thus partially transmitted through the light polarization plane or the semi-reflective mirror plane of the prism and is directed to an information-carrying surface of a rotating video and/or audio disc directly or through a lens system. If the beam splitter prism is of the type having a light polarization plane formed therein, a quarter-wave plate is provided between the beam splitter prism and the video and/or audio disc so that a beam of linearly polarized light emanating from the beam splitter prism is circularly polarized into two component segments respectively oscillating on planes inclined at 45 degrees to the oscillating plane of the beam of light incident on the polarization plane.

The information-carrying surface of the rotating video and/or audio disc is scanned by the beam of light incident thereon so that a beam of light carrying the information read out from the information-carrying surface of the disc is reflected therefrom. The reflected beam of light is directed backwardly to the beam splitter prism and is re-directed from the light polarization plane or the semi-reflective mirror plane of the prism toward a light-sensitive transducer element such as a photo diode usually through a focussing lens provided between the prism and the transducer element. The signals carried by the beam of light incident on the transducer element is thus converted into electric signals representative of the information read out from the video and/or audio disc. In the optical system using the beam splitter prism of the type having the light polarization plane, the component beams of circularly polarized light reflected from the video and/or audio disc are united by the quarter-wave plate into a beam of linearly polarized light. The beam of linearly polarized light thus emanating backwardly from the quarter wave plate oscillates in a plane perpendicular to the transmission axis of the light polarization plane of the beam splitter prism and is totally reflected from the light polarization plane toward the above mentioned light-sensitive transducer element.

A drawback inherent in prior-art optical systems of the natures above described is that the beam splitter prism incorporated therein has a bulky parallelepiped construction and for this reason requires a large space for the accommodation of the prism in the signal pickup device using the optical system. Another drawback is that the pentahedral component segments constituting the beam splitter prism have a total of ten surfaces to be polished and require a large number of steps and meticuous and highly skilled control over the accuracy of geometrical dimensions of the prism during fabrication of the prism. A third drawback inherent in prior-art optical systems of the described natures consists in the difficulty in taking precise alignment between the parallelepiped beam splitter prism and the lens or each of the lenses provided in combination with the prism.

The present invention contemplates elimination of these and other drawbacks inherent in prior-art optical systems of the described natures.

It is, accordingly, an important object of the present invention to provide an improved optical system featuring, inter alia, a beam splitter prism having a simple and compact construction that will permit of significant reduction of the overall dimensions of a signal pickup device into which the optical system may be incorporated.

It is another important object of the present invention to provide an improved optical system featuring a beam splitter prism composed of component segments each having a significantly reduced number of surfaces to be polished during fabrication of the prism.

It is still another important object of the present invention to provide an improved optical system in which alignment can be easily and accurately taken between optical elements including a beam splitter prism.

It is, yet, another important object of the present invention to provide an optical system which is simple and compact in construction and which is easy and economical to manufacture.

SUMMARY OF THE INVENTION

In accordance with the present invention, there is provided an optical system for use in a signal pickup device, comprising a beam splitter prism having a predetermined path of light therethrough and comprising two component segments respectively having flat base surfaces held in contact with each other and forming therebetween a junction plane at a predetermined angle to the above mentioned path of light, the junction plane constituting one of a light polarization plane and a semi-reflective mirror plane each of the component segments having an outwardly curved surface portion.

In a preferred embodiment of the optical system according to the present invention, the beam splitter prism has a circular cross section and each of the component segments of the prism has a center axis normal to the cross section of the prism and is truncated to have an elliptical end face inclined at the above mentioned predetermined angle with respect to the center axis of the segment, the base surface of each of the component segments being constituted by the elliptical end face of each of the segments. In this instance, the predetermined angle at which the elliptical end face of each of the component segments is inclined to the center axis of the segment is preferably 45 degrees.

In another preferred embodiment of the optical system according to the present invention, the respective curved surface portions of the component segments constituting the beam splitter prism are curved about axes which are perpendicular in non-intersecting relationship to each other and which preferably pass through the aforesaid predetermined path of light through the beam splitter prism. In this instance, at least one of the component segments of the beam splitter prism preferably further has a side face with respect to which the base surface of the segment is inclined at a predetermined angle of, preferably, 45 degrees.

BRIEF DESCRIPTION OF THE DRAWINGS

The drawbacks of prior-art optical systems of the natures to which the present invention appertains and the features and advantages of an optical system according to the present invention will be more clearly understood from the following description taken in conjunction with the accompanying drawings in which like reference numerals and characters designate similar or corresponding members, elements and beams of light and in which:

FIG. 4 is a schematic perspective view showing still another example of the prior-art optical system of the natures to which the present invention appertains;

FIG. 5 is a schematic plan view showing a first preferred embodiment of an optical system according to the present invention;

FIG. 6 is a perspective view showing, to an enlarged scale, a beam splitter prism forming part of the optical system illustrated in FIG. 5;

FIG. 7 is a perspective view showing one of the component segments constituting the beam splitter prism illustrated in FIG. 6;

FIG. 8 is a perspective view showing a beam splitter prism forming part of a second preferred embodiment of an optical system according to the present invention;

FIG. 9 is a perspective view showing a third preferred embodiment of an optical system according to the present invention;

FIG. 10A is a plan view of beam splitter prism forming part of the optical system illustrated in FIG. 8;

FIG. 10B is a side elevation of one of the component segments constituting the beam splitter prism shown in FIG. 10A;

FIG. 10C is a front end view of the beam splitter prism illustrated in FIG. 10A;

FURTHER DESCRIPTION OF THE PRIOR ART

FIGS. 1 to 4 of the drawings show some representative examples of known optical systems of optical video disc players which are presently in use.

Figure 1:
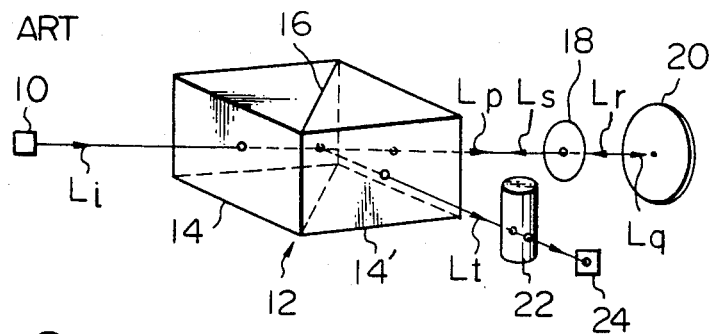
FIG. 1 is a schematic perspective view showing an example of prior-art optical systems of the natures to which the present invention appertains.

In the optical system illustrated in FIG. 1, a beam of light Li emitted from a suitable light source 10 such as a semiconductor laser radiation element is passed through a beam splitter prism 12 composed of a pair of equilaterally pentahedral component segments 14 and 14'. The component segments 14 and 14' are cemented together over their respective base surfaces each of which is inclined at the angle of 45 degrees with respect to the side surfaces of the segments. The base surfaces of the segments 14 and 14' thus united together form a light polarization plane 16 which is angled at 45 degrees to an optical axis on which the beam of light from the light source 10 is to travel through the prism 12.

The beam of the light Li emitted from the light source 10 enters the beam splitter prism 12 at right angles to one of the side surfaces of one component segment 14 of the prism 12 and is passed through the polarization plane 16 at the angle of 45 degrees thereto, leaving the prism 12 at right angles to one of the side surfaces of the other component segment 14'. When the beam of light Li is incident on the light polarization plane 16, only the light oscillaring in a direction parallel with the transmission axis of the light polarization plane 16 is transmitted through the plane with the remaining components of the light absorbed in or reflected from the polarization plane 16. Thus, a beam of linearly polarized light Lp emerges from the beam splitter prism 12 and is directed toward a quarter-wave plate 18 which is positioned perpendicularly to the optical axis on which the beam of polarized light Lp is to advance from the prism 12. As well known in the art, a beam of linearly polarized light incident on a quarter-wave plate is broken up into two component beams of light respectively oscillating on planes intersecting each other at right angles and each inclined at 45 degrees to the oscillating plane of the incident light. The beam of polarized light Lp incident on the quarter-wave plate 18 in the shown arrangement is thus split into two component beams of circularly polarized light Lq which are linearly polarized at 45 degrees to the oscillating plane of the beam of polarized light Lp. The beam of circularly polarized light Lq is incident on an information-carrying surface of an optical video disc 20 on which the signals representative of the information to be reproduced are stored in the form of pits formed in the information-carrying surface, as also well known in the art. The video signals thus stored on the disc are read out by the beam of circularly polarized light Lq incident on the information-carrying surface of the disc 20. It follows that beams of light Lr which are also circularly polarized but which have contained therein the information read out from the disc 20 are reflected perpendicularly from the information-carrying surface of the disc 20 and are directed backwardly to the quarter-wave plate 18 along the optical axis on which the original beams of the circularly polarized light Lq issue from the quarter-wave plate 18. The reflected beams of circularly polarized light Lr are thus incident backwardly on the quarter-wave plate 18 and are united into a single beam of linearly polarized light Ls which is linearly polarized at the angle of 45 degrees to each of the beams of circularly polarized light Lr and accordingly at the angle of 90 degrees to the original beam of linearly polarized light Lp. The beam of linearly polarized light Ls passes into the beam splitter prism 12 and is incident on the polarization plane 16 thereof. The oscillating plane of the beam of linearly polarized light Ls being perpendicular to the transmission axis of the plane 16, the beam of light Ls incident on the polarization plane 16 is almost totally reflected from the plane 16 as a reflected component Lt. The reflected component Lt is passed through a cylindrical condenser lens 22 and is thereby condensed onto a light-sensitive transducer element 24 such as a photo diode. The light-sensitive transducer element 24 is adapted to produce electric signals from the signals read out from the video disc 20 as above discussed.

Figure 2:
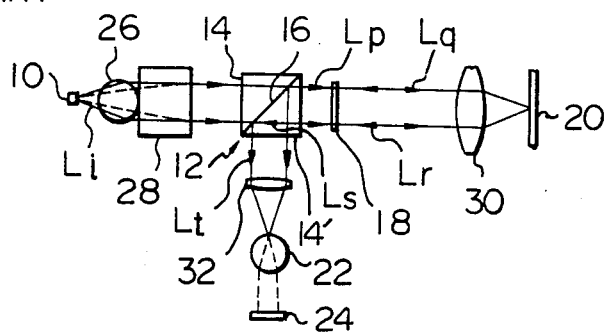
FIG. 2 is a view essentially similar to FIG. 1 but shows another example of the prior-art optical systems of the natures to which the present invention appertains.
Figure 3:
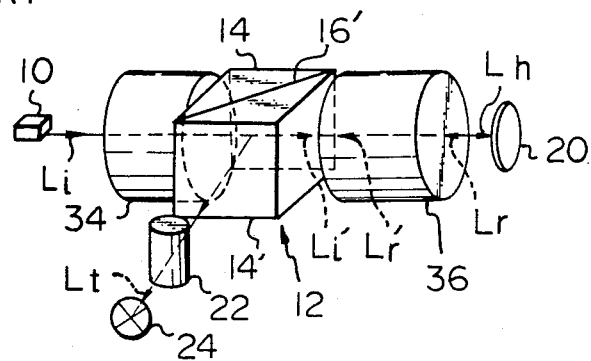
FIG. 3 is a schematic plan view showing still another example of the prior-art optical systems of the natures to which the present invention appertains.

The optical systems illustrated in FIGS. 2 to 4 are known modified versions of the optical system hereinbefore described with reference to FIG. 1.

In the prior-art optical system of FIG. 2, a combination of two cylindrical condenser lenses 26 and 28 is provided between a light source 10 and a beam splitter prism 12. The condenser lenses 26 and 28 are positioned in such a manner that the respective center axes thereof extend at right angles in non-intersecting relationship to each other and pass through the optical axis between the light source 10 and the beam splitter prism 12. The divergent, asymmetrical beam of light Li emanating from the light source 10 is thus rendered into a cylindrical beam of condensed light having a circular cross section when passed successively through the two lenses 26 and 28. The optical system shown in FIG. 2 further comprises a lens 30 positioned between a quarter-wave plate 18 and a video disc 20 and a lens 32 positioned between the beam splitter prism 12 and the light-sensitive transducer element 24. The lens 30 provided between the square-wave plate 18 and the video disc 30 is used to have the beams of circularly polarized light Lq from the quarter-wave plate 18 condensed on to the information-carrying surface of the video disc 20 and further to have the reflected beam of the linearly polarized light Lr collimated before the beam reaches the square-wave plate 18. On the other hand, the lens 32 provided between the beam splitter prism 12 and a cylindrical condenser lens 22 serves to have the beam of linearly polarized light Lt from the beam splitter prism 12 condensed onto the peripheral surface of the cylindrical condenser lens 22.

In the prior-art optical system illustrated in FIG. 3, the respective base surfaces of the component segments 14 and 14' of a beam splitter prism 12 are processed so that the junction plane constituted by the base surfaces forms a semi-reflective mirror plane 16'. As well known in the art, a beam of light incident on a semi-reflective mirror plane is in part transmitted therethrough and in part reflected therefrom. The beam splitter prism 12 of this nature is positioned between two cylindrical beam condenser lenses 34 and 36 each composed of a bundle of glass fiber extending in parallel with the center axis of the lens. The beam condenser lens 34 is positioned between a light source 10 and the beam splitter prism 12 and has its center axis located on the optical axis between the light source 10 and the prism 12 and one of its end faces held in contact with one of the side surfaces of the component segment 14 of the prism 12. The beam condenser lens 34 thus arranged serves to collect the divergent, assymetrical beam of light emitted from the light source 10 and transmit a cylindrical beam of light to the beam splitter prism 12 therethrough. The beam splitter prism 12 of the system shown in FIG. 3 being constructed so that the junction plane forms the semi-reflective mirror plane 16' as above described, there is no quarter-wave plate provided between the beam splitter prism 12 and a video disc 20. The beam condenser lens 36 posterior to the prism 12 is positioned directly between the prism 12 and the video disc 20 in such a manner as to have its center axis located on the optical axis between the prism 12 and the disc 20 and one of its end faces held in contact with one of the side surfaces of the component segment 14' of the prism 12 as shown. The beam condenser lens 36 thus arranged serves to transmit a beam of light from the beam splitter prism 12 toward the video disc 20 therethrough and to collect a beam of light reflected from the disc 20 and transmit the reflected beam of light back to the prism 12 therethrough.

In the prior-art optical system thus constructed and arranged, a beam of light Li emitted from the light source 10 is collected into a cylindrical beam Li by the beam condenser lens 34 anterior to the beam splitter prism 12. The beam of light Li' is transmitted from the beam condenser lens 34 into the beam splitter prism 12 and is in part reflected from the junction plane 16' and in part passed through the semi-reflective mirror plane 16' as indicated by arrowhead Lh. The beam of light Lh thus passed through the semi-reflective mirror plane 16' of the beam splitter prism 12 enters the beam condenser lens 36 and is directed through the beam condenser lens 36 toward the video disc 20. The beam of light Lh thus incident on the information-carrying surface of the video disc 20 is reflected therefrom as a beam of light Lr carrying thereon the signals read out from information-carrying surface of the disc 20. The reflected beam of light Lr is collected into a beam of light Lr' by the beam condenser lens 36 and is backwardly admitted into the beam splitter prism 12. The beam of light Lr' thus entering the beam splitter prism 12 is in part transmitted through the semi-reflective mirror plane 16' of the prism 12 and in part reflected from the plane 16' toward a cylindrical condenser lens 22 as a reflected component Lt. The reflected component Lt is focussed by the lens 22 at a light-sensitive transducer element 24 as in the prior-art optical system illustrated in FIG. 1.

The prior-art optical system shown in FIG. 4 also uses a beam splitter prism 12 of the type having a semi-reflective mirror plane 16' formed by the junction plane between the respective base surfaces of the component segments 14 and 14' of the prism 12. In the system of FIG. 4, such a beam splitter prism 12 is provided in combination with a combination of two cylindrical condenser lenses 26 and 28 which are arranged similarly to their respective counterparts in the optical system illustrated in FIG. 2. The divergent, asymmetrical beam of light Li emanating from a light source 10 is thus rendered into a cylindrical beam of condensed light having a circular cross section when passed successively through these condenser lenses 26 and 28 as described with reference to FIG. 2.

Some prominent drawbacks are involved in each of the prior-art optical systems hereinbefore described with reference to FIGS. 1 to 4. One of such drawbacks results from the bulky parallelepiped construction of the beam splitter prism 12 composed of the two component segments 14 and 14'. The bulky construction of the beam splitter prism 12 requires a disproportionately large space for the accommodation of the prism 12 in the signal pickup device incorporating the optical system, with the result that there is a limitation in reducing the overall dimensions of the signal pickup device. Because, furthermore, of the fact that the pentahedral component segments 14 and 14' constituting the beam splitter prism 12 have a total of ten surfaces to be polished during fabrication of the prism 12, not only a large number of steps but also meticulous and highly skilled control over the accuracy of geometrical dimensions are required in the process of producing the prism 12, giving rise to an increase in the production cost of the optical system as a whole. Another drawback inherent in each of the described prior-art optical systems consists in the difficulty encountered in making strictly precise alignment between the parallelepiped beam splitter prism 12 and the lens or lenses provided in combination with the beam splitter prism 12.

DESCRIPTION OF THE PREFERRED EMBODIMENTS

Referring to FIG. 5 of the drawings, a first preferred embodiment of an optical system according to the present invention comprises a suitable source of light 40, a cylindrical light condenser lens 42, a beam splitter prism 44, a quarter-wave plate 46 and a focussing lens 48. The light source 40 may be constituted by a semiconductor laser radiation element such as a laser diode which per se is well known in the art and is operative to emit a beam of light Li along a predetermined straight path therefrom. The cylindrical light condenser lens 42 has a center axis perpendicularly intersecting the path of the beam of light Li emitted from the light source 40 and serves to render the beam of light Li from the light source 40 into a beam of condensed light.

As will be better seen from FIG. 6 of the drawings, the beam splitter prism 44 is cylindrical in its entirety and is composed of two component segments 50 and 50' having respective center axes aligned with each other and substantially equal diameters. Each of the component segments 50 and 50' is truncated to have an elliptical end face inclined at the angle of 45 degrees to the center axis of the segment and constituting a base surface of the segment as will be further better seen from FIG. 7. Each of the segments further has a circular end face substantially perpendicular to the center axis of the segment as will also be seen from FIG. 7. The respective base surfaces of the two component segments 50 and 50' are cemented together or otherwise firmly held in contact with each other so as to form a junction plane 52 between the segments 50 and 50'. The beam splitter prism 44 thus constructed is positioned between the light condenser lens 42 and the quarter-wave plate 46 in such a manner as to have its center axis oriented perpendicularly to the path of the light to be emitted from the light source 40, as shown.

The inclined base surface of at least one of the component segments 50 and 50' of the beam splitter prism 44 is coated with, for example, a birefringent substance so that the junction plane 52 between the component segments 50 and 50' constitutes a light polarization plane having a transmission axis perpendicular to the path of the light to be incident on the prism 42. The cylindrical light condenser lens 42 is bonded to or otherwise firmly held in contact with the peripheral surface of the beam splitter prism 44. In the embodiment shown in FIG. 5, furthermore, it is assumed, by way of example, that each of the component segments 50 and 50' of the beam splitter prism 44 has a maximum axial length larger than the diameter of the segment.

The quarter-wave plate 46 is positioned at a predetermined distance from the circular end face the other component segment 50' of the beam splitter prism 44 and has opposite end faces perpendicular to the path of the light to be transmitted through the beam splitter prism 44. On the other hand, the focussing lens 48 is of the biconvex type and is positioned between the quarter-wave plate 46 and an information-carrying surface of a video and/or audio disc 54 to be played back.

The embodiment of the optical system illustrated in FIG. 5 further comprises a biconvex focussing lens 56 and a light-sensitive transducer element 58 such as a photodiode. The biconvex focussing lens 56 is positioned at a predetermined spacing from the circular end face of one of the component segments such as the component segment 50' of the beam splitter prism 44 in such a manner as to have its optical axis located on a plane intersecting the light polarization plane 52 of the beam splitter prism 44 at the angle of 45 degrees thereto. On the other hand, the light-sensitive sensitive transducer element 58 is positioned at a focus of the focussing lens 56 which is positioned intermediate between the beam splitter prism 44 and the transducer element 58.

In the optical system thus constructed and arranged, the beam of light Li emitted from the light source 40 is passed through the cylindrical beam collector lens 42 into the beam splitter prism 44 perpendicularly to the center axis of the prism 44 and is incident on at the angle of 45 degrees the light polarization plane 52 of prism 44 through one component segment 50 of the prism 44. Of the beam of light Li thus incident on the light polarization plane 52, only the light oscillating in a plane parallel with the transmission axis of the polarization plane 52 is allowed to pass the plane 52 so that a beam of linearly polarized light Lp emerges from the beam splitter prism 44 through the other component segment 50' of the prism 44 in a direction perpendicular to the center axis of the prism 44. The beam of linearly polarized light Lp is directed toward the quarter-wave plane 46 and is thereby broken up into two component beams of circularly polarized light Lq respectively oscillating in planes intersecting at right angles to each other and inclined at 45 degrees to the oscillating plane of the incident form of linearly polarized light Lp. The component beams of circularly polarized light Lq thus emanating from the quarter-wave plate 46 are focussed by the focussing lens 48 at the information-carrying surface of the rotating video and/or audio disc 54 and read out the signals stored on the information-carrying surface of the disc. The component beams of light Lq are thus reflected from the information-carrying surface of the video and/or audio disc 54 as reflected beams of light Lr which are also circularly polarized but which have contained therein the information read out from the information-carrying surface of the disc 54. The reflected beams of light Lr are directed from the disc 54 toward the quarter-wave plate 46 through the focussing lens 48 which now serves as a collimator.

The reflected beams of circularly polarized light Lr are backwardly incident on the quarter-wave plate 46 and are thereby united together into a single beam of linearly polarized light Ls which is linearly polarized at the angle of 45 degrees to each of the beams of circularly polarized light Lr. The beam of linearly polarized light Ls enters the beam splitter prism 44 backwardly through the component segment 50' of the prism 44 along a path coincident with the path of the beam of light Lp forwardly issuing from the light polarization plane 52 of the prism 44. The beam of linearly polarized light Ls is thus backwardly incident at the angle of 45 degrees on the light polarization plane 52 of the beam splitter prism 44. The beam of linearly polarized light Ls oscillates in a plane perpendicular to the transmission axis of the light polarization plane 52 of the beam splitter prism 44 and is thus substantially totally reflected from the polarization plane 52 toward the focussing lens 56 as a beam of light Lt travelling in a direction aligned with the center axis of the prism 44 as will be seen from FIG. 6. The beam of light Ls is focussed by the lens 56 at the light-sensitive transducer element 58, which produces electric signals corresponding to the signals carried on the beam of light Lt.

In the optical system embodying the present invention as hereinbefore described, the beam splitter prism 44 is cylindrical in shape and serves not only as a beam splitter but similarly to the cylindrical beam condenser lens 28 in each of the prior-art optical systems illustrated in FIGS. 2 and 4. Thus, the combination of the cylindrical light condenser lens 42 and the beam splitter prism 44 functions similarly to the combination of the cylindrical beam condenser lenses 26 and 28 in each of the optical systems of FIGS. 2 and 4 and is effective to render the divergent, asymmetrical beam of light from the light source 40 into a cylindrical beam of condensed light. For this reason, an additional lens such as the cylindrical beam condenser lens 28 need not be provided in the embodiment illustrated in FIG. 5.

Because, furthermore, of the fact that the beam of linearly polarized light Ls emanating from the quarter-wave plate 46 enters a curved surface portion of the component segment 50' of the beam splitter prism 44, an additional lens such as the cylindrical beam condenser lens incorporated in each of the prior-art optical systems illustrated in FIGS. 1 to 4 need not be provided in the above described embodiment of the present invention.

While the beam splitter prism 44 in the embodiment of FIG. 5 is positioned at right angles to the path of light from the light source 40, the beam splitter prism 44 may be otherwise positioned with respect to the path of light from the light source 40. FIG. 8 shows an embodiment in which a beam splitter prism which per se is of similar construction to the beam splitter prism 44 in the hereinbefore described embodiment of the present invention is positioned to have its center axis aligned with the path of light from the light source 40. In the optical system in which the beam splitter prism 44 is thus positioned, one of the component segments such as the component segment 52 of the beam splitter prism 44 is axially directed toward a light source 40 and the other component segment 52' of the prism 44 is axially directed toward a quarter-wave plate 46.

In the optical system thus constructed and arranged, the beam of light Li emitted from the light source 40 is passed through a cylindrical light collector lens (not shown in FIG. 8) corresponding to the lens 42 in the system illustrated in FIG. 5 and enters the beam splitter prism 44 in a direction aligned with the center axis of the prism 44. The beam of light Li is incident at the angle of 45 degrees on the light polarization plane 52 of the beam splitter prism 44 through one component segment 50 of the prism 44. As a consequence, a beam of linearly polarized light Lp emerges from the beam splitter prism 44 through the other component segment 50' of the prism 44 in a direction aligned with the center axis of the prism 44. The beam of linearly polarized light Lp is directed to the quarter-wave plate 46 and is split into two component beams of circularly polarized light Lq as previously described in connection with the embodiment of FIG. 5. The component beams of light Lq is directed to a video and/or audio disc (not shown in FIG. 8) and is reflected as a beam of light Lr from an information-carrying surface of the disc. The reflected beams of light Lr are united together by means of the quarter-wave plate 46 into a single beam of linearly polarized light Ls, which enters the splitter prism 44 backwardly through the component segment 50' of the prism 44. The beam of light Ls is incident at the angle of 45 degrees on the light polarization plane 52 of the beam splitter prism 44 and is substantially totally reflected therefrom as a reflected beam of linearly polarized light Lt. The beam of light Lt advances toward a light-sensitive transducer element (not shown) in a direction perpendicular to the center axis of the beam splitter prism 44 and is focussed at the transducer element by a focussing lens 56 provided between the prism 44 and the transducer element.

In each of the embodiments of the present invention as hereinbefore described, the beam splitter prism 44 has an axial length larger than the diameter of the prism 44. The beam splitter prism featuring the optical system according to the present invention may however be so shaped as to have an axial length substantially equal to the diameter thereof. FIG. 9 of the drawings shows an embodiment using such a beam splitter prism which is now designated in its entirety by reference numeral 60.

As will be better seen from FIGS. 10A, 10B and 10C of the drawings, the beam splitter prism 60 is composed of a pair of truncated cylindrical component segments 62 and 62' having respective center axes aligned with each other and substantially equal diameters. Each of the component segments 62 and 62' has an elliptical end face inclined at the angle of 45 degrees to the center axis of the segment and constituting a base surface of the segment. The respective base surfaces of the component segments 62 and 62' are cemented together or otherwise firmly held in contact with each other so as to form a junction plane 64 between the segments 62 and 62'. The base surface of at least one of the component segments 62 and 62' is processed so that the junction plane 64 formed by the respective base surfaces of the segments constitutes a semi-reflective mirror plane effective to cause a beam of light to partially pass therethrough and to be partially reflected therefrom. Furthermore, each of the component segments 62 and 62' has a maximum axial length substantially equal to the diameter of the segment so that the beam splitter prism 60 composed of the two component segments 62 and 62' has an axial length substantially equal to the diameter of the prism 60.

The beam splitter prism 60 thus constructed is positioned between two cylindrical beam condenser lenses 66 and 68. One of the cylindrical beam condenser lenses 66 and 68 has one of its end faces bonded to or otherwise closely held in contact with one end face of the beam splitter prism 60 and, likewise, the other of the beam condenser lenses 66 and 68 is bonded to or otherwise closely held in contact with the other end face of the beam splitter prism 60 as shown in FIG. 9. The cylindrical beam condenser lenses 66 and 68 thus secured to the beam splitter prism 60 have respective center axes substantially aligned with the center axis of the beam splitter prism 60. The resultant assembly of the beam splitter prism 60 and the beam condenser lenses 66 and 68 is positioned between a light source 40 and a video and/or audio disc 54 in such a manner that the respective center axes of the prism 60 and lenses 66 and 68 are substantially aligned with the path of light to be emitted from the light source 40 toward the video and/or audio disc 54. A light-sensitive transducer element 58 such as a photodiode is positioned laterally of the beam splitter prism 60 and is directed at the angle of 45 degrees to the semi-reflective plane 64 of the prism 60, as shown.

Figure 11:
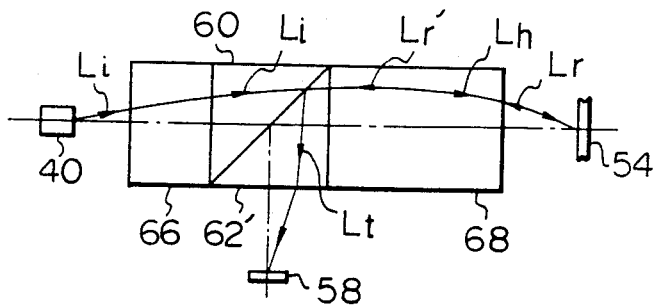
FIG. 11 is a schematic plan view showing the paths of light in the optical system illustrated in FIG. 9.

In the optical system constructed and arranged as hereinbefore described, a beam of light Li is emitted from the light source 40 and is collected into a beam of light Li' by the beam condenser lens 66 as shown in FIG. 11. The beam of light Li' is transmitted from the beam collector lens 66 into the beam splitter prism 60 and is incident at the angle of 45 degrees on the semi-reflective mirror plane 64 of the beam splitter prism 60 through one component segment 62 of the prism 60. The beam of light Li thus incident on the semi-reflective mirror plane 64 of the beam splitter prism 60 is in part reflected at the angle of 45 degrees from the mirror plane 64 and in part passed through the mirror plane 64 as a beam of light Lh. If, in this instance, the semi-reflective mirror plane 64 of the beam splitter prism 60 is assumed to have the reflectivity of 70 percent and the transmissivity of 30 percent, the amount of light transmitted through the semi-reflective mirror plane 64 of the beam splitter prism 60 accounts for 30 percent of the light incident on the plane 64. The beam of light Lh emerging from the beam splitter prism 60 through the component segment 62' of the prism 60 is passed through the beam condenser lens 68 to the information-carrying surface of the video and/or audio disc 54 and reflected as a beam of light Lr from the information-carrying surface of the disc 54. The reflected beam of light Lr thus carrying the signals read out from the information-carrying surface of the disc 54 is condensed into a beam of light Lr' in the beam condenser lens 68. The beam of light Lr' travels backwardly through the beam condenser lens 68 into the beam splitter prism 60 through the component segment 62' of the prism 60 and is in part transmitted through the semi-reflective mirror plane 64 of the beam splitter prism 60 and in part reflected from the mirror plane 64 as a beam of light Lt. As a consequence, 21 percent of the light originally admitted into the beam splitter prism 60 is allowed to travel toward the light-sensitive transducer element 58 from the beam splitter prism 60.

Figure 12:
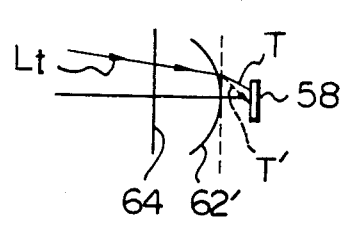
FIG. 12 is a schematic view showing the path of light from the beam splitter prism to a light-sensitive transducer element in the optical system illustrated in FIG. 9.

In this instance, the beam of light Lt reflected from the semi-reflective mirror plane 64 of the beam splitter prism 60 emerges from the prism 60 through a curved surface portion of the component segment 62' of the prism 60. The light travelling in a plane containing the center axis of the beam splitter prism 60 is therefore refracted at an angle determined by the index of refraction of the segment 62' as indicated at T in FIG. 12. On the other hand, the light travelling on a plane perpendicular to the center axis of the beam splitter prism 60 is further refracted at the curved surface portion of the component segment 62' as indicated at T' in FIG. 12. The beam of light Lt thus refracted is incident on the light-sensitive transducer element 58 and causes the transducer element 58 to produce electric signals corresponding to the optical signals carried on the beam of light Lt. The light-sensitive transducer element 58 has an effective surface divided into four sections which are arranged at 45 degrees with respect to the center axis of the beam splitter prism 60. A signal is produced which is representative of the sum of the outputs produced along each of the diagonal lines between these sections due to the astigmatism of the beam splitter prism 60. A focus signal is derived from the errors between the signals thus produced and a record signal is derived from the sum of the signals produced from the four sections of the transducer element 58.

Figure 13:
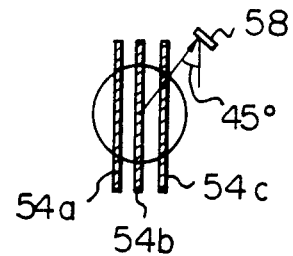
FIG. 13 is a schematic view showing the arrangement in which the light-transducer element of the optical system illustrated in FIG. 2 is positioned with respect to the signal tracks on an information-carrying surface of a video disc being played back.

On the other hand, the optical system including the beam splitter prism 60 and the light-sensitive transducer element 58 is arranged so that the line joining the center point G and the center point of the effective surface of the transducer element 58 extends at the angle of 45 degrees to a direction tangential to tracks 54a, 54b and 54c of the video and/or audio disc 54 as indicated in FIG. 13. If, therefore, the beam of light incident on the four sections of the transducer element 58 happens to be asymmetrical with respect to a direction perpendicular to the tracks 54a, 54b and 54c of the disc 54 due to a tracking error caused in the optical system, the respective sums of the outputs produced along the individual diagonal lines between the four sections of the transducer element 58 vary with equal quantities with the result that the errors between the respective signals representative of the sums of the above mentioned outputs are not affected by the tracking error. The focus signal can thus be prevented from being degraded by the occurrence of a tracking error when the tracking servo loop is open.

While it has been assumed that the beam splitter prism 60 in the embodiment hereinbefore described is of the semi-reflective type, one or each of the base surfaces of the component segments 62 and 62' of the prism 60 may be processed so that the junction plane 64 formed therebetween constitutes a light polarization plane. In this instance, the beam splitter prism 60 is used in combination with quarter-wave plate positioned between the prism 60 and the video and/or audio disc 54.

Figure 14:
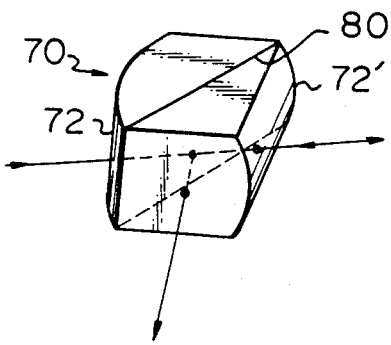
FIG. 14 is a perspective view showing a beam splitter prism forming part of a fourth preferred embodiment of an optical system according to the present invention.
Figure 15A:
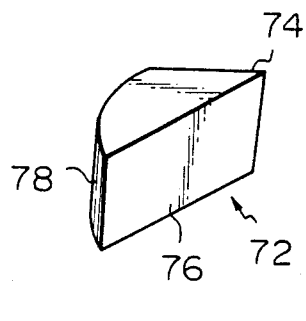
FIG. 15A is a perspective view showing one of the component segments constituting the beam splitter prism illustrated in FIG. 14.
Figure 15B:
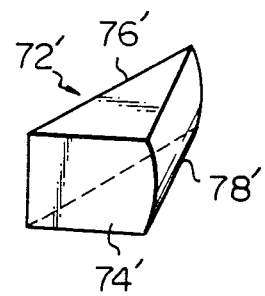
FIG. 15B is a perspective view showing the other of the component segments constituting the beam splitter prism illustrated in FIG. 14.

FIG. 14 shows a beam splitter prism forming part of a fourth preferred embodiment of the optical system according to the present invention. The beam splitter prism, designated in its entirety by reference numeral 70, is composed of a pair of component segments 72 and 72'. As will be better seen from FIG. 15A, one component segment 72 of the beam splitter prism 70 has a flat side face 74, an inclined base surface 76 inclined at the angle of 45 degrees to the side face 74, and a curved surface 78 outwardly curved between the side face 74 and the base surface 76. Likewise, the other component segment 72' of the beam splitter prism 70 has a flat side face 74', an inclined base surface 76' inclined at the angle of 45 degrees to the side face 74', and a curved surface 78' outwardly curved between the opposite end faces and the base surface 76' as shown in FIG. 15B. The respective base surfaces 76 and 76' of the component segments 72 and 72' thus shaped are cemented together or otherwise closely held in contact with each other so as to form therebetween a junction plane 80 which is inclined at the angle of 45 degrees to each of the respective side faces 74 and 74' of the component segments 72 and 72′, as shown in FIG. 14. The curved surfaces 78 and 78′ of the component segments 72 and 72′, respectively, thus held together are curved about axes which are perpendicular in non-intersecting relationship to each other. The respective base surfaces 76 and 76′ of the component segments 72 and 72′ are, furthermore, processed so that the junction plane 80 formed therebetween constitutes either a light polarization plane or a semi-reflective mirror plane.

The beam splitter prism 70 constructed as above described is positioned between a light source and a video and/or audio disc with the curved surface 78 of one component segment 72 directed toward the light source and the curved surface 78′ of the other component segment 72′ directed toward an information-carrying surface of the disc and further with a light-sensitive transducer element positioned at a spacing from the side face of one of the component segments such as the side face 74′ of the component segment 72′, though not shown in the drawings. Between the beam splitter prism 70 and the video and/or audio disc is further provided a quarter-wave plate if the beam splitter prism 70 is of the light polarization type.

In an optical system having the beam splitter prism 72 arranged in this fashion, a beam of light Li emitted from the light source enters the beam splitter prism 70 through one component segment 72 of the prism 70. The beam of light Li thus incident on the component segment 72 is condensed in planes perpendicular to the axis about which the curved surface 78 of the component segment 72 is curved. The beam of the light Lc thus condensed is partially transmitted through the light polarization or semi-reflective mirror plane 80 of the beam splitter prism 70 and enters the other component segment 72′ of the prism 70. The beam of light Lc travels forwardly through the component segment 72′ of the beam splitter prism 70 and is further condensed in planes perpendicular to the axis of curvature of the curved surface 78′ of the component segment 72′ when the beam of light Lc is leaving the segment 72′. The resultant beam of light Lc′ is directed to the information-carrying surface of the video and/or audio disc directly or through the quarter-wave plate positioned between the beam splitter prism 70 and the disc and is reflected from the disc as a beam of light Lr carrying the signals read out from the information-carrying surface of the disc. The reflected beam of light Lr travels to the beam splitter prism 70 directly or through the quarter-wave plate and enters the beam splitter prism 70 backwardly through the component segment 72′ of the prism 70. In this instance, the reflected beam of light Lr is condensed in planes perpendicular to the axis of curvature of the curved surface 78′ of the component segment 72′ and the resultant beam of condensed light Ld is totally or partially reflected from the light polarization or semi-reflective mirror plane 80 of the beam splitter prism 70 toward the light-sensitive transducer element.

Figure 16:
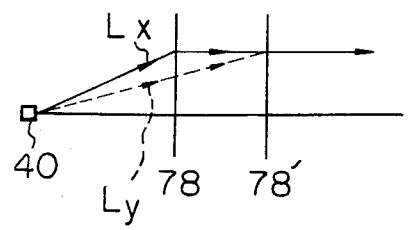
FIG. 16 is a schematic view showing the paths of light through the beam splitter prism illustrated in FIG. 14.

The radius of curvature of the curved surface 78 of the component segment 72 of the beam splitter prism 70 is selected so that the component of light emitted from the light source 40 and divergent in planes perpendicular to the axis of curvature of the curved surface 78 as represented by Lx in FIG. 16 of the drawings is condensed into a collimated beam having a predetermined minimum diameter. Likewise, the radius of curvature of the curved surface 78′ of the component segment 72′ is selected so that the light component of originating in the light source 40 and divergent in planes perpendicular to the axis of curvature of the curved surface 78′ as represented by Ly in FIG. 16 is condensed into a collimated beam having a minimum diameter equal to the minimum diameter of the beam resulting from the light Lx. A beam of light passed through the component segments 72 and 72′ having the radii of curvature thus selected is cylindrical and has a diameter which is equal to the minimum diameters of the collimated beams respectively resulting from the components Lx and Ly of light.

What is claimed is:

1. An optical system for use in a signal pickup device, comprising a beam splitter prism having a predetermined path of light therethrough and comprising two component segments respectively having flat base surfaces held in contact with each other and forming therebetween a junction plane at a predetermined angle of 45 degrees to said path of light, said junction plane constituting one of a light polarization plane and a semi-reflective mirror plane and each of the component segments having an outwardly curved surface portion and in which said beam splitter is cylindrical in shape and has a circular cross section and in which each of said component segments has a center axis normal to said cross section and is truncated to have an elliptical end face inclined at said predetermined angle with respect to said center axis, the base surface of each of the component segments being constituted by said elliptical end face.

2. An optical system as set forth in claim 1, in which said beam splitter prism has an axial length larger than the diameter thereof.

3. An optical system as set forth in claim 1, in which said beam splitter prism has an axial length substantially equal to the diameter thereof.

4. An optical system as set forth in claim 1, in which said path of light is substantially perpendicular to the respective center axes of said component segments.

5. An optical system as set forth in claim 1, in which said path of light is substantially coincident with the respective center axes of said component segments.

6. An optical information pick-up device for picking up recorded information from a recording surface of a recording medium, comprising:
  a light source for producing a light beam;
  a beam splitter prism for conveying said light beam toward said recording surface and directing a light beam reflecting from said recording surface in a direction different from the direction of said light beam from said light source, and;
  light receiving means for receiving the reflected light beam passed through said beam splitter prism and for producing an electric signal corresponding to the intensity of the light beam incident thereon, said beam splitter prism having at least one predetermined path of light therethrough and including two component segments respectively having flat base surfaces held in contact with each other and forming therebetween a junction plane at a predetermined angle to said path of light, said junction plane constituting either one of a light polarization plane and a semi-reflective mirror plane to function as a light separating plane, each of the component segments having an outwardly curved cylindrical surface portion, so that said beam splitter prism is cylindrical in overall shape thereof, and said path of light passing through said cylindrical surface portion so that astigmatism occurs in a light beam propagating along said path of light.

7. An optical information pick-up device according to claim 6 including a pair of cylindrical beam condenser lenses positioned on opposite sides of said beam splitter prism and in coaxial relationship with each other.

8. An optical system as set forth in claim 6, in which said beam splitter prism has an axial length larger than the diameter thereof.

9. An optical system as set forth in claim 6, in which said beam splitter prism has an axial length substantially equal to the diameter thereof.

10. An optical system as set forth in claim 6. in which said path of light is substantially perpendicular to the respective center axes of said component segments.

11. An optical system as set forth in claim 6, in which said path of light is substantially coincident with the respective center axes of said component segments.

* * * * *